(12) United States Patent
Fisher (10) Patent No.: US 10,261,801 B2
(45) Date of Patent: Apr. 16, 2019

(54) DYNAMICALLY DETERMINING A MODE OF A DATA PROCESSING APPLICATION

(71) Applicant: Ab Initio Technology LLC, Lexington, MA (US)

(72) Inventor: Ben Fisher, Baldwin, NY (US)

(73) Assignee: Ab Initio Technology LLC, Lexington, MA (US)

(*) Notice: Subject to any disclaimer, the term of this patent is extended or adjusted under 35 U.S.C. 154(b) by 717 days.

(21) Appl. No.: 14/568,605

(22) Filed: Dec. 12, 2014

(65) Prior Publication Data

US 2015/0169332 A1 Jun. 18, 2015

Related U.S. Application Data

(60) Provisional application No. 61/915,805, filed on Dec. 13, 2013.

(51) Int. Cl.
| | |
|---|---|
| *G06F 17/30* | (2006.01) |
| *G06F 7/00* | (2006.01) |
| *G06F 9/4401* | (2018.01) |
| *G06F 13/38* | (2006.01) |
| *G06F 9/445* | (2018.01) |
| *G06F 9/448* | (2018.01) |

(52) U.S. Cl.
CPC ............ *G06F 9/441* (2013.01); *G06F 9/4494* (2018.02); *G06F 9/44521* (2013.01); *G06F 9/44536* (2013.01); *G06F 13/385* (2013.01); *G06F 17/30106* (2013.01)

(58) Field of Classification Search
CPC .. G06F 9/441; G06F 13/385; G06F 17/30106; G06F 9/4436; G06F 9/44521; G06F 9/44536

USPC .......................................................... 707/769
See application file for complete search history.

(56) References Cited

U.S. PATENT DOCUMENTS

| | | | | |
|---|---|---|---|---|
| 3,518,413 A | * | 6/1970 | Holtey | G06F 9/226 |
| | | | | 712/E9.006 |
| 3,560,935 A | * | 2/1971 | Beers | G06F 9/4812 |
| | | | | 710/262 |
| 8,301,798 B2 | * | 10/2012 | Mond | G06Q 10/00 |
| | | | | 709/201 |

(Continued)

FOREIGN PATENT DOCUMENTS

| | | |
|---|---|---|
| JP | 2005-521938 | 7/2005 |
| JP | H10-228450 | 8/2010 |
| JP | 2013-528884 | 7/2013 |

OTHER PUBLICATIONS

International Search Report and Written Opinion, PCT/US2014/070002, dated Mar. 13, 2015 (9 pages).

(Continued)

*Primary Examiner* — Kuen S Lu
(74) *Attorney, Agent, or Firm* — Fish & Richardson P.C.

(57) ABSTRACT

A method includes receiving a request to process a set of data using a data processing application. The method includes, based on a feature associated with the set of data, selecting between (i) a first mode in which one or more running processes of the data processing application are used to process the set of data and (2) a second mode in which one or more new processes of the data processing application are started up. The method includes causing the data processing application to be executed according to the selected mode to process the set of data.

31 Claims, 8 Drawing Sheets

(56) References Cited

U.S. PATENT DOCUMENTS

| | | | |
|---|---|---|---|
| 8,689,185 B1* | 4/2014 | Myers | G06F 9/4843 |
| | | | 717/124 |
| 2004/0006630 A1 | 1/2004 | Friend et al. | |
| 2008/0270403 A1 | 9/2008 | Bookman et al. | |
| 2010/0217783 A1 | 8/2010 | Farver et al. | |
| 2011/0307897 A1* | 12/2011 | Atterbury | G06F 9/4436 |
| | | | 718/102 |
| 2015/0058316 A1* | 2/2015 | Bruno | G06F 17/30442 |
| | | | 707/718 |

OTHER PUBLICATIONS

"WebSphere Extended Deployment Compute Grid," IBM, Retrieved from the Internet: http://www-03.ibm.com/software/products/en/extended-deployment-compute-grid.

International Preliminary Report on Patentability, PCT/US2014/070002, dated Jun. 14, 2016 (6 pages).

Japanese Office Action issued in JP Application No. 2016-536986, dated Jan. 7, 2019 (English Translation) 4 pages.

Search Report and Written Opinion issued in Singapore Patent Application No. 11201604356Q, dated Sep. 11, 2018 (7 pages).

\* cited by examiner

|   | ABC Corp. | The Credit Co. | Smith's |
|---|---|---|---|
| TXT | 100 | 100 | 120 |
| XLS | 60 | 60 | 72 |
| CSV | 100 | 100 | 120 |
| SWIFT92 | 40 | 40 | 48 |

DYNAMICALLY DETERMINING A MODE OF A DATA PROCESSING APPLICATION

CLAIM OF PRIORITY

This application claims priority to U.S. Provisional Application Ser. No. 61/915,805, filed on Dec. 13, 2013, the entire contents of which are incorporated here by reference in their entirety.

BACKGROUND

This description relates to dynamically determining a mode of operation of a data processing application.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows.

SUMMARY

In a general aspect, a method includes receiving a request to process a set of data using a data processing application. The method includes, based on a feature associated with the set of data, selecting between (i) a first mode in which one or more running processes of the data processing application are used to process the set of data and (2) a second mode in which one or more new processes of the data processing application are started up. The method includes causing the data processing application to be executed according to the selected mode to process the set of data.

Embodiments may include one or more of the following features.

The one or more running processes are compiled and loaded into a memory prior to receiving the request to process the set of data.

The one or more running processes are in a standby mode prior to receiving the request to process the set of data.

The method includes, when the second mode is selected, compiling the data processing application and loading the compiled data processing application into a memory.

The one or more new processes include a process that is not compiled or loaded into memory prior to receiving the request to process the set of data.

The feature associated with the set of data includes one or more of a size of the set of data, a format of the set of data, or a complexity of the set of data.

Selecting between the first mode and the second mode includes selecting the first mode when the size of the set of data is equal to or less than a threshold size; and selecting the second mode when the size of the set of data exceeds the threshold size.

In some cases, the threshold size is based on a format of the set of data, and at least two different formats are each associated with a different threshold size. In some cases, the threshold size is based on a processing requirement associated with the set of data, and at least two different processing requirements are each associated with a different threshold size. In some cases, the threshold size is based on historical data indicative of the operation of the data processing application. In some cases, the method includes determining the threshold size during execution of the data processing application, for instance, by decreasing the threshold size if the data processing application executed according to the first mode executes more slowly than a reference rate; and increasing the threshold size if the data processing application executed according to the second mode executes more slowly than a reference rate.

The method includes determining a size of the set of data. In some cases, the set of data includes a file, and determining the size of the set of data includes determining the size of the file. In some cases, the set of data includes data stored in a database, and determining the size of the set of data includes querying the database.

The feature associated with the set of data includes a processing requirement associated with the set of data, such as an allowed time for processing the set of data.

In the first mode, a component of the data processing application is compiled to machine code prior to receiving the request, and in the second mode, the component is compiled to machine code after receiving the request.

In the first mode, the one or more running processes are executed serially, and in the second mode, at least some of the one or more new processes are executed concurrently.

In a general aspect, software is stored on a computer-readable medium, the software including instructions for causing a computing system to receive a request to process a set of data using a data processing application; based on a feature associated with the set of data, select between (i) a first mode in which one or more running processes of the data processing application are used to process the set of data and (2) a second mode in which one or more new processes of the data processing application are started up; and cause the data processing application to be executed according to the selected mode to process the set of data.

In a general aspect, a computing system includes at least one processor configured to receive a request to process a set of data using a data processing application; based on a feature associated with the set of data, select between (i) a first mode in which one or more running processes of the data processing application are used to process the set of data and (2) a second mode in which one or more new processes of the data processing application are started up; and cause the data processing application to be executed according to the selected mode to process the set of data. In an aspect, the operations performed by the methods described herein can be executed by the computing system and/or the software stored on a computer-readable medium.

In a general aspect, a computing system includes means for receiving a request to process a set of data using a data processing application; means for, based on a feature associated with the set of data, selecting between (i) a first mode in which one or more running processes of the data processing application are used to process the set of data and (2) a second mode in which one or more new processes of the data processing application are started up; and means for causing the data processing application to be executed according to the selected mode to process the set of data.

In a general aspect, a method includes receiving a request to process a set of data using a data processing application; identifying a particular mode of operation from multiple modes of operation of the data processing application based on a size of the set of data; and executing the data processing application according to the particular mode of operation to process the set of data.

Embodiments can include one or more of the following features.

Identifying the particular mode of operation includes selecting either a batch processing mode or a continuous processing mode. Identifying the particular mode of operation includes selecting the batch processing mode when the size of the set of data exceeds a threshold size; and selecting the continuous processing mode when the size of the set of data is less than the threshold size.

The method includes determining the size of the set of data. The set of data includes a file, and wherein determining the size of the set of data includes determining the size of the file. The set of data includes data stored in a database, and wherein determining the size of the set of data includes querying the database.

Identifying a particular mode of operation includes determining whether the size of the set of data exceeds a threshold size. The threshold size is based on a format of the set of data or a processing requirement associated with the set of data. The processing requirement includes an allowed time for processing the set of data. The method includes determining the threshold size. The method includes determining the threshold size based on historical data indicative of the operation of the data processing application. The method includes dynamically determining the threshold size.

The data processing application includes at least one computation graph. The computation graph can be executed in a batch processing mode or a continuous processing mode.

Aspects can include one or more of the following advantages.

The approach to dynamically determining a mode of operation of a data processing application enables a single application to efficiently process both large sets of data and small sets of data in a flexible manner. For instance, in a situation in which most requests involve a small set of data and only occasional requests involve a large set of data, both types of requests can be processed efficiently by the same processing framework. In addition, because the data processing application uses the same algorithms and the same code regardless of its mode of operation, design and editing of the data processing application can be simplified thereby reducing costs, development efforts and downtime in environments such as research, development or logistics.

Other features and advantages of the invention will become apparent from the following description, and from the claims.

DESCRIPTION

We describe here an approach to dynamically determining a mode of operation of a data processing application. A data processing application that is executable to process a set of data can be executed in multiple modes, depending on features of the data to be processed, such as characteristics of the data and requirements associated with the processing of the data. The mode of execution can also depend on operational characteristics associated with a computing system executing the data processing application. For instance, a batch processing mode can be used for processing large sets of data and a continuous processing mode that has minimal startup time can be used for processing smaller sets of data. The mode of operation of the data processing application can be dynamically selected, e.g., when a request to process a set of data by the data processing application is received.

Figure 1:
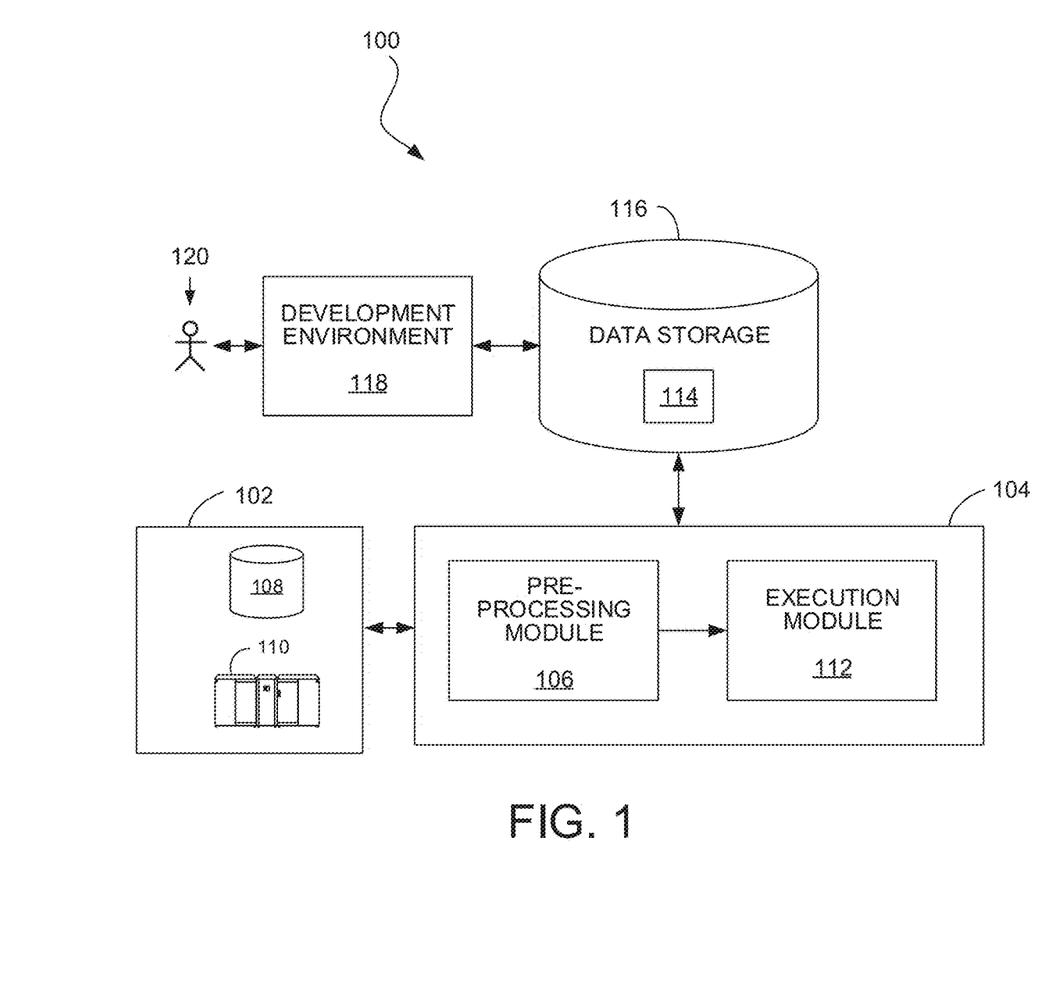
FIG. 1 is a block diagram of a data processing system.

FIG. 1 shows an example of a data processing system 100 in which the techniques for dynamically determining a mode of operation of a data processing application can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or machine data. An execution environment 104 includes a pre-processing module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 102 may be local to the execution environment 104, for example, being stored on a storage medium (e.g., hard drive 108) connected to a computer hosting the execution environment 104, or may be remote to the execution environment 104, for example, being hosted on a remote system (e.g., mainframe computer 110) in communication with a computer hosting the execution environment 104, over a remote connection (e.g., provided by a cloud computing infrastructure).

The pre-processing module 106 reads data from the data source 102 and prepares data processing applications for execution. For instance, the pre-processing module 106 can compile a data processing application, store and/or load a compiled data processing application to and/or from a data storage system 116 accessible to the execution environment 104, and perform other tasks to prepare a data processing application for execution.

The execution module 112 executes the data processing application prepared by the pre-processing module 106 to process a set of data and generate output data 114 that results from the processing. The output data 114 may be stored back in the data source 102 or in a data storage system 116 accessible to the execution environment 104, or otherwise used. The data storage system 116 is also accessible to a development environment 118 in which a developer 120 is able to design and edit the data processing applications to be executed by the execution module 112. The development environment 118 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," the contents of which are incorporated herein by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 106 can receive data from a variety of types of systems that may embody the data source 102, including different forms of database systems. The data may be organized as records having values for respective fields (also called "attributes" or "columns"), including possibly null values. When first reading data from a data source, the pre-processing module 106 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Figure 2:
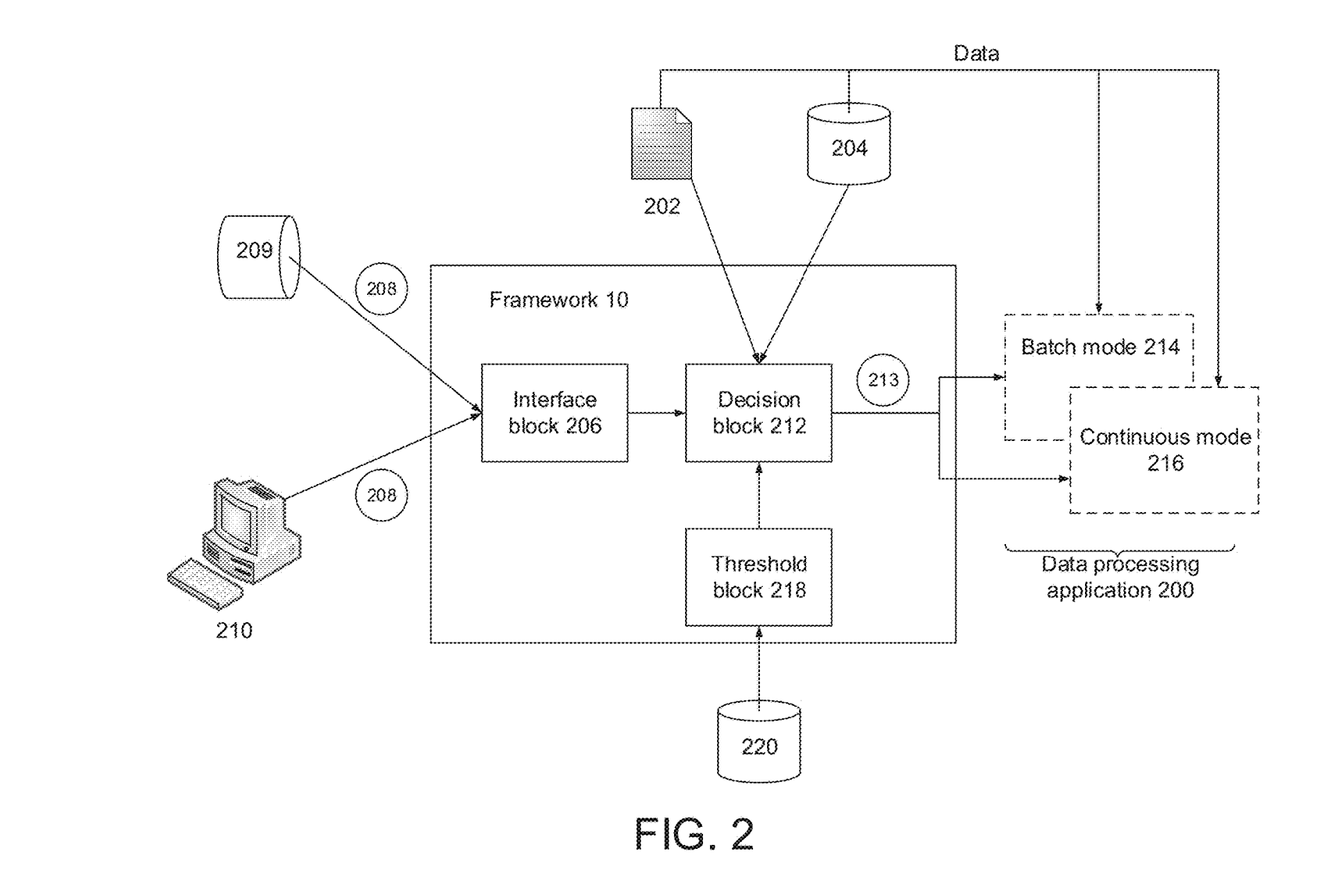
FIG. 2 is a block diagram of a processing framework for a data processing application.

Referring to FIG. 2, in some examples, the execution module 112 executes a processing framework 10 that acts as an interface to a data processing application 200. The data processing application 200 can be any executable application that processes data from a data source, such as a file 202, a database 204, or another type of data source. For instance, the data processing application 200 can be an application that records telephone transaction data, an application that retrieves requested credit card transaction data, or another type of application. In some cases, the data processing application 200 can be implemented as a dataflow graph. The processing framework 10 is a set of one or more computational components that can interface to the data processing application 200 but that is agnostic to the nature of the particular data processing application 200. The processing framework 10 can be reusable. That is, for instance, the same components of the processing framework 10 can be used to interface with different data processing applications 200.

In some implementations, the processing framework 10 includes an interface block 206 that receives a request 208 to process a particular set of data, such as a specific file 202 or certain records from a specific database 204. The request 208 can be sent by a requester 210, such as a person or an automated computing system. In some cases, the request 208 can be received from a queue 209 that stores one or more requests that are waiting to be processed. The request 208 can include information about the type of job that is to be executed for the set of data (e.g., an identifier of the data processing application 200) and information about the source of the set of data (e.g., an identifier of the file 202 or database 204).

In some examples, the set of data to be processed is an inbound feed, meaning that the request 208 includes or directly identifies the set of data (e.g., the request 208 can include a path and filename for the file 202). An example of an inbound feed is a payment file, provided with the request 208, that includes data indicative of credit card activity for multiple customers and that is provided to the data processing application 200 to be validated, mapped, and loaded into a database table. In some examples, the set of data to be processed is an outbound feed, meaning that the request 208 identifies data that is to be retrieved by the data processing application 200 from the database 204. For instance, the request 208 can include information that can be used by the data processing application 200 to generate a query to be applied to the database 204. One example of an outbound feed is the set of data that satisfies an individual credit card customer's request to view his credit card transactions for the month of October. Another example of an outbound feed is the set of data that satisfies a request from an automated accounting system for all sales transactions at Shopping World department store during the second quarter of 2013.

To process the set of data responsive to the request 208, the data processing application 200 can be executed in any of multiple modes of operation (e.g., a batch mode 214 or a continuous mode 216). A decision block 212 of the processing framework 10 can select the mode of operation to be used by the data processing application 200 to process a particular set of data (e.g., data from a specific file 202 or database 204). For instance, the decision block 212 can select the mode of operation of the data processing application 200 based on one or more features of the set of data. The features of the set of data can include, e.g., characteristics of the set of data or requirements associated with processing the set of data. Example characteristics of the set of data include, e.g., the size of the set of data (e.g., the volume of the set of data, the number of records in the set of data, the complexity of the set of data, etc.), the format of the set of data (e.g., the file format of the file 202 or the record format of records in the database 204), the complexity of the set of data (e.g., the vectors or subvectors associated with the set of data), and/or other characteristics of the set of data. For instance, in one example, the data processing application 200 can operate in batch mode 214 to process large volumes of data and can operate in continuous mode 216 to process small volumes of data. An example requirement associated with processing the set of data includes an amount of time allotted to processing the set of data. In some examples, the decision block 212 can select the mode of operation of the data processing application 200 based on one or more operational characteristics associated with the computing system executing the data processing application 200, such as the time of day or day of the week, the capacity of the system (e.g., a real time capacity, a forecasted capacity, or an average capacity), or another operational characteristic.

Operating the data processing application in batch mode 214 allows the data processing application 200 to process large amounts of data quickly but at the cost of a relatively long startup time. When operated in continuous mode 216, the data processing application 200 has little to no startup time but does not process data as quickly. That is, when operated in continuous mode 216, the data processing application is running and startup processes such as compilation and loading do not need to be carried out in order to process data, as discussed in more detail below. The same data processing algorithms that are implemented by the data processing application 200 can be executed in either batch mode or continuous mode.

In some examples, the decision block 212 can assess the size of the set of data to be processed (e.g., the size of the file 202 or the size of the records that will be retrieved from the database 204 responsive to a query) and compare that size to a threshold size for the data processing application 200. If the size of the set of data is greater than the threshold size, the decision block 212 can send a command 213 to execute the data processing application 200 in batch mode 214. If the size of the set of data is less than the threshold size, the command 213 causes the data processing application 200 to be executed in continuous mode 216. The data (e.g., the file 202 or records from the database 204) are received at the data processing application 200 and processed according to the mode specified by the command 213.

The threshold size can depend on one or more features of the set of data. For instance, in some examples, the threshold size can depend on the format of the set of data, such as a file format of the file 202 or a record format of records in the database 204. That is, for instance, each file format or record format can have an associated threshold size. For instance, a first database may contain sales transaction records that have a large number of fields (e.g., 50 fields, including a saleprice field), while a second database contains sales transaction records that have a small number of fields (e.g., 5 fields, including a saleprice field). For a data processing application 200 that operates only on the saleprice field of any record, the absolute size of the records is less important than the number of records that will be processed. That is, because the records of the first database are ten times larger than the records of the second database, the threshold size for records of the first database may be approximately ten times larger than the threshold size for records of the second database.

In some examples, the threshold size can depend on requirements associated with processing the set of data. For instance, a client whose data is processed using the data processing application 200 (e.g., a credit card company) may have an agreement, such as a service-level agreement (SLA), with the provider of the data processing application 200 that specifies contracted processing times for that client's data. In some examples, a client can have a tiered SLA that specifies a contracted processing time for each of multiple sizes of the data to be processed. For instance, a tiered SLA may specify that a set of data representing less than 100,000 transactions is to be processed within 10 seconds, a set of data representing between 100,000 and one million transactions is to be processed within 3 minutes, and a set of data representing between one to ten million transactions is to be processed within 30 minutes. The processing times specified by an SLA of a particular client can be used to determine the threshold size for that client. For instance, threshold size can be set so as to allow the client's SLA to be satisfied (e.g., based on how large of a set of data can be processed by continuous mode execution of the data processing application in order to satisfy the SLA).

In some examples, the threshold size can depend on operational characteristics associated with the computing system executing the data processing application 200. For instance, the threshold size can be based on historical data indicative of the performance of the data processing application 200 in batch mode 214 and continuous mode 216. The threshold size can be based on real time data indicative of the on-going performance of the data processing application 200. For instance, in one example, if real-time data indicate that the continuous mode 216 data processing application 200 is running more slowly than a reference rate (e.g., an historical average rate), the threshold size can be dynamically decreased to shift more sets of data to batch mode processing 214. If real-time data indicate that the batch mode 214 data processing application 200 is running more slowly than a reference rate (e.g., an historical average rate), the threshold size can be dynamically increased. In one example, if real-time data indicate that the computing system executing the data processing application 200 has less capacity than usual, the threshold size can be dynamically changed to adjust for the reduced capacity of the computing system.

In some examples, a threshold block 218 can look up the threshold size for a particular set of data to be processed by a particular data processing application for a particular client in a threshold database 220, such as in a lookup table of the threshold database. For instance, the threshold database 220 can include a lookup table for a particular data processing application in which the lookup table includes records that indicate the threshold size for various data formats and for various clients.

Figure 3:
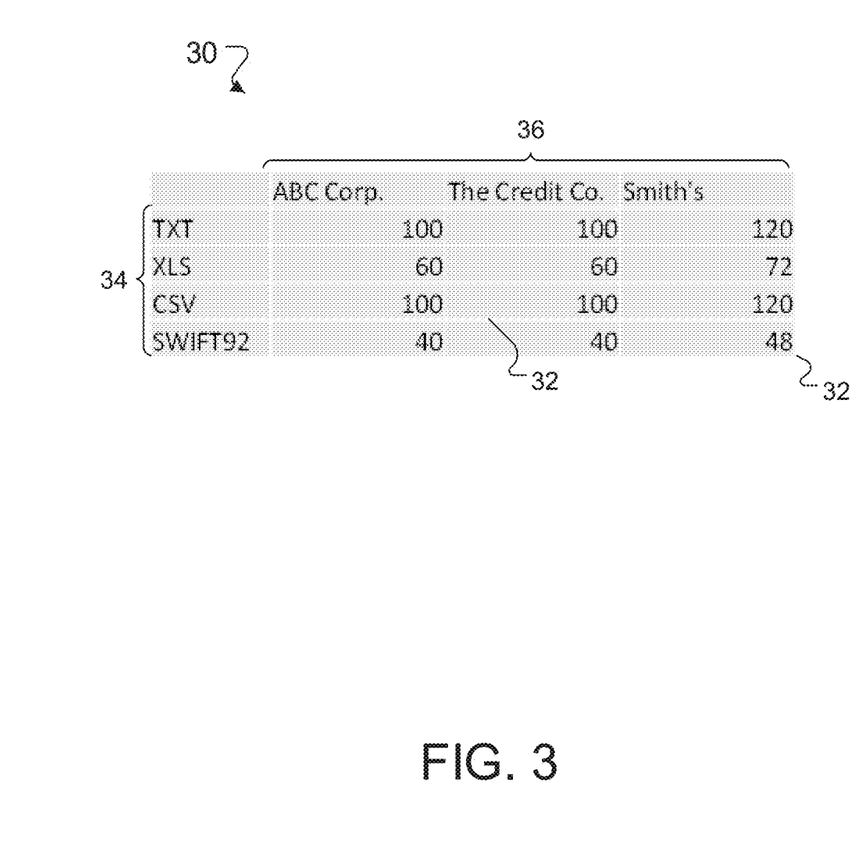
FIG. 3 is an example of a lookup table.

FIG. 3 shows a portion of an example of a lookup table 30 in the threshold database 220. Each entry 32 in the lookup table 30 represents the threshold size for a particular data format 34 and for a particular client 36. If a client 36 has an agreement, such as an SLA, that specifies one or more contracted processing times for processing data of a particular size, the threshold time can reflect that client's agreement. If a client 36 has no agreement, a default threshold size can be used. In the example of FIG. 3, the clients ABC Corp. and The Credit Co. share common default threshold sizes. The client Smith's has an agreement, such as an SLA, that provides for a faster contracted processing time, thus requiring processing of Smith's data to be completed in less time. To meet Smith's SLA, the threshold size for Smith's data is larger, which allows larger sets of data to be processed in continuous mode.

In some examples, the threshold size for a given data processing application, data format, and/or client is specified by a user, e.g., by a system operator. In some examples, the threshold size is determined by the threshold block 218. For instance, the threshold block 218 can determine a default threshold size for a particular data processing application 200 and for a particular data format by identifying the size of a set of data at which the processing time in batch mode 214 equals or is faster than the processing time in continuous mode 216. To incorporate client-specific agreements regarding processing time, the threshold block 218 can determine the size of a data set that can be processed in the contracted amount of time by batch mode 214 and/or continuous mode 216. In some examples, the threshold block 218 can determine a threshold size, such as a default threshold size or a client-specific threshold size based on historical data indicative of the performance of the data processing application 200 in batch mode 214 and continuous mode 216.

In some cases, the threshold block 218 can dynamically determine the threshold size, e.g., based on real time data indicative of the on-going performance of the data processing application 200. For instance, in one example, if real-time data indicate that the continuous mode 216 data processing application 200 is running more slowly than its historical average, the threshold block 218 can dynamically decrease the threshold size to shift more sets of data to batch mode processing 214. In one example, if real-time data indicate that the computing system executing the data processing application 200 has less capacity than usual, the threshold block 218 can dynamically change the threshold size to adjust for the reduced capacity of the computing system.

As mentioned above, batch mode operation 214 of the data processing application 200 can be selected for processing large sets of data. By batch mode, we mean a data processing application 200 that is started up (e.g., compiled and launched as a new process) after receiving a request to process a set of data. A new process is a process that is compiled and loaded into memory after the request to process data is received. In some examples a batch mode data processing application can be terminated after processing the entire set of data. In some examples, in batch mode processing, multiple processes of the data processing application can be run concurrently once the data processing application is compiled and launched. In general, batch mode operation 214 involves a longer startup time than continuous mode operation (discussed below), which can render batch mode operation less efficient than continuous mode when processing only a small amount of data. Once the data processing application 200 is launched in batch mode 214, however, the data processing application 200 can rapidly and efficiently process data.

For instance, when executed in batch mode 214, the data processing application 200 starts up as a new process when the first item of a set of data is ready for processing by the data processing application. The startup tasks include compiling and loading the components of the data processing application and integrating the compiled and loaded data processing application into the processing framework 10. Once the startup tasks are completed, multiple processes associated with the data processing application can be run concurrently on one or more computing devices, enabling the batch mode data processing application to process large amounts of data efficiently. When processing is complete, the operation of the data processing application 200 is terminated. That is, to operate the data processing application 200 in batch mode 214, the data processing application is started up as a new process to process a discrete set of data and is terminated once processing is complete.

Compilation is the process by which a computer program, such as the data processing application 200, is prepared to be executed by a computer. Compilation can result in the generation of machine code, instructions ready to be executed on a computer, and/or intermediate code to be executed by a virtual machine executing on a computer (e.g., Java byte code). The process of compiling a data processing application 200 and preparing the data processing application 200 for execution involves various stages. An uncompiled representation of the data processing application 200 is retrieved from a data storage (e.g., from the data storage system 116) along with any associated parameters that provide values to be used in the compilation process. Example parameters include information such as, e.g., the name of the computing device executing the data processing application 200, the directory to which results of the data processing application 200 are to be output, the filename of a file to which to write the results, and other parameters. During a static parameter resolution phase, static parameters (whose values are designated for resolution before run-time) are resolved and the resolved values are bound to the static parameters. Some parameters may be designated as dynamic parameters that are left unresolved during compilation, to be resolved later, e.g., just before run-time. In some examples, unresolved parameters are read at run-time from a file by the batch mode data processing application 200. During a compilation phase, data structures representing the data processing application 200 are generated for use during execution of the data processing application 200. Compilation can also include compiling embedded scripts in scripting languages into bytecode or machine code. At run-time, any dynamic parameters associated with the data processing application 200 are bound to resolved values. The data structures of the compiled data processing application 200 are launched by starting one or more processes, opening any needed files, and/or linking dynamic libraries. A flow of data through the data processing application 200 can also be set up, e.g., by allocating shared memory or opening a TCP/IP stream.

Once the batch mode data processing application 200 is compiled and loaded, the set of data can be processed relatively quickly. However, if the set of data is small, the time involved in compiling the data processing application 200, loading the data processing application 200, and preparing the data processing application 200 for execution (referred to collectively as the startup time) can dominate the execution time of the data processing application 200. That is, if only a small amount of data is processed by the batch mode data processing application 200, the startup time can be comparable to or even exceed the processing time. For instance, if the startup time of a batch mode data processing application 200 is about five seconds and the processing time for a small set of data is about five seconds, then only half of the total elapsed time is used for actual processing of the set of data. The relatively long startup time thus makes executing the data processing application 200 in batch mode 214 relatively inefficient for processing small sets of data.

To avoid the inefficiency of a long startup time, small sets of data can be processed by the data processing application 200 in continuous mode 216. By continuous mode, we mean a data processing application that is compiled, loaded, and initialized prior to receiving data for processing. We sometimes refer to a data processing application that is compiled, loaded, and initialized prior to receiving data for processing as a running process. A process can be considered a running process even if the process is not actively processing data, for instance, if the process is in standby because there is no input data for processing by the process. In some examples, continuous mode processes can run serially when processing data. In continuous mode 216, some of the tasks that are performed during startup of the batch mode data processing application 200 are performed instead in an earlier compilation phase that does not occur for every set of data. Rather, when executed in continuous mode 216, the data processing application 200 is compiled, loaded, and initialized prior to receiving data for processing. That is, for instance, in continuous mode 216, the data processing application 200 is continuously active on the computing device and can start processing data as soon as a request for processing is received. Thus, the startup time associated with compiling, loading, and preparing the data processing application does not apply to each individual set of data, allowing small sets of data to be processed more efficiently. In order to ensure that the continuous mode data processing application 200 processes a particular set of data according to parameters that are appropriate for that set of data, the parameters are passed to the continuous mode data processing application 200 along with the request to process the set of data.

In some examples, to execute in continuous mode 216, the data processing application 200 can be implemented as one or more "micrographs" that can be dynamically loaded into (and unloaded from) the processing framework 10. A micrograph is a precompiled dataflow graph stored, in compiled form, in a data storage system (e.g., the data storage system 116). The compiled micrograph includes the data structures that represent the components of the micrograph and the links that enable the micrograph to be integrated into the processing framework 10. A compiled micrograph can be retrieved dynamically and embedded directly into the processing framework 10 in real time, e.g., when the command 208 instructs the data processing application 200 to execute in continuous mode 216. Micrographs are described in more detail in U.S. application Ser. No. 13/161,010, filed Jun. 15, 2011, the contents of which are incorporated herein by reference in their entirety.

For instance, to achieve rapid loading of a micrograph, the micrograph can be serialized prior to being stored in the data storage system 116. Serialization is a process by which a compiled data processing application 200 is translated into a binary stream of zeroes and ones such that the data processing application 200 is in a form that can be easily stored in persistent memory or in a memory buffer. A serialized micrograph can be easily retrieved and its data structures de-serialized and loaded dynamically at run-time, thus enabling rapid loading of the micrograph.

In some examples, when a command 208 is received to execute the data processing application 200 in continuous mode 216 to process a set of data, the precompiled micrograph is loaded and integrated into the processing framework 10. In some cases, the micrograph can be detached and unloaded from the processing framework 10 once processing of the set of data is complete. In some cases, the micrograph can be detached from the processing framework 10 but can remain loaded in memory (e.g., using a caching mechanism), such that the detached micrograph can be quickly reintegrated into the processing framework 10 at a later time without reloading the micrograph (e.g., when a command is received to process a subsequent set of data).

The decision block 212 itself can be implemented in a continuous mode, e.g., as a micrograph, to avoid delays in selecting the appropriate mode of operation for the data processing application 200.

In some examples, a data processing application can implement multiple copies of a single micrograph, for instance, to allow a measure of control over data flow through the data processing application. For instance, a set of data to be processed by a data processing application 200 can be partitioned among a set of two or more micrographs according to a load balancing algorithm, such as a round robin approach, a selection of the least utilized micrograph, or another algorithm.

In some examples, a data processing application 200 can be executed in a serial batch mode in which a large set of data is divided into multiple groups to be processed in series by the data processing application 200. For instance, when executed in serial batch mode, the data processing application 200 can be compiled a single time and executed in series to process the multiple groups of data. In some examples, a data processing application 200 can be executed in parallel batch mode, in which a large set of data is divided into multiple groups to be processed simultaneously by multiple identical data processing applications running in parallel.

Figure 4:
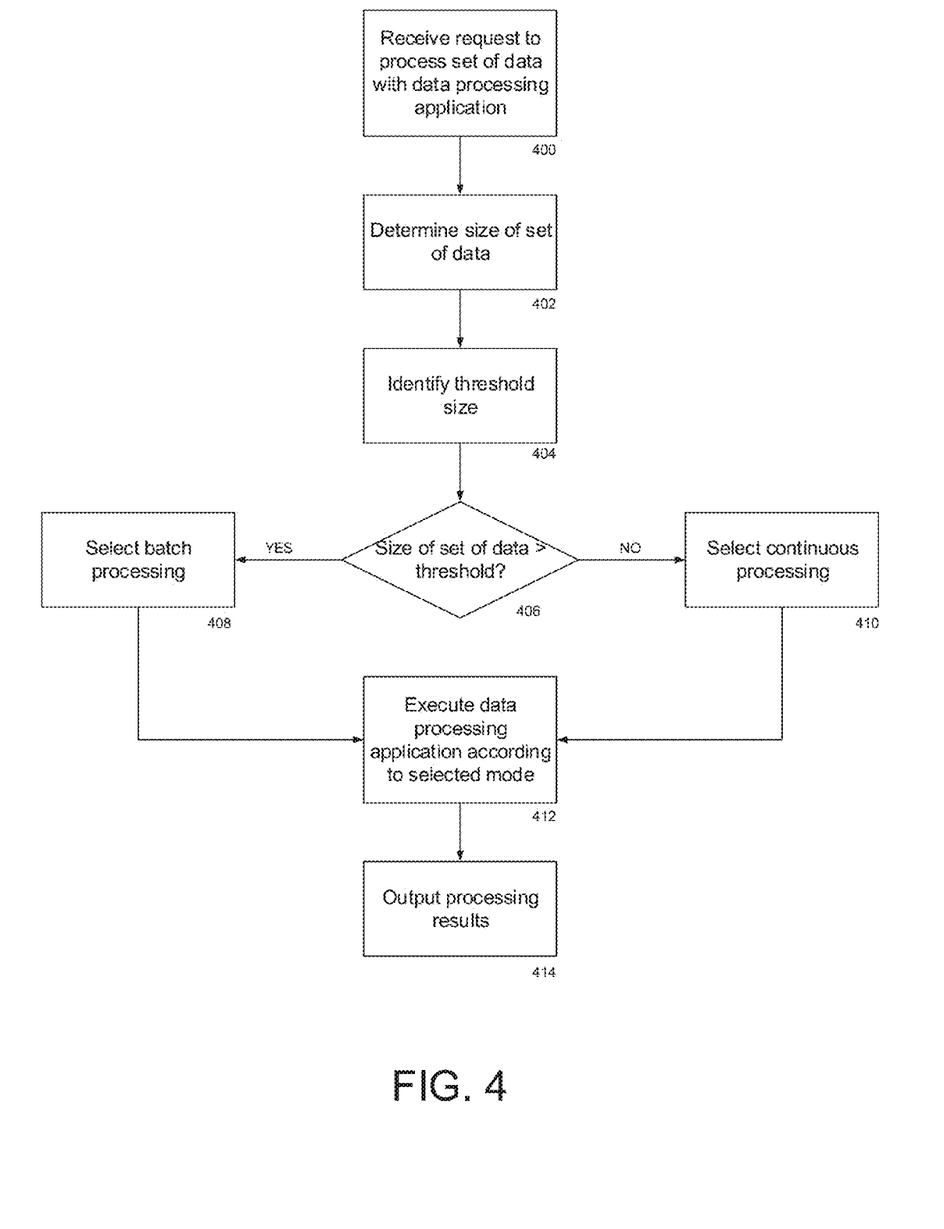
FIG. 4 is a flowchart.

Referring to FIG. 4, in a general approach, a request is received to process a set of data using a data processing application (400). In some examples, the request can include the set of data, such as a file to be processed by the data processing application (an inbound feed). For example, the request 208 can include the file 202. In some examples, the request can identify the data that is to be retrieved by the data processing application from a database (an outbound feed).

The size of the set of data is determined or estimated (402). For an inbound feed (e.g., a file), the size of the set of data is the size of the file and can be determined, e.g., by accessing properties associated with the file. For instance, if the inbound feed is a payment file containing credit card transaction records to be added to a database, the size of the set of data is the size of the payment file. For an outbound feed (e.g., data retrieved from a database), the size of the set of data is the size of the records to be retrieved from the database in response to a query. In some examples, the size of an outbound feed can be determined by pre-querying the database, e.g., by requesting the first 100 records that satisfy the query. If the database quickly returns the first 100 records, a small size can be estimated for the outbound feed. If the database returns the first 100 records slowly or not at all, a large size can be estimated for the outbound feed. In some examples, the size of an outbound feed can be determined by querying the database for the number of records that satisfy the query.

A threshold size for the set of data is identified (404), for instance, by accessing a lookup table that tabulates the threshold size for various data formats and/or for various clients for the data processing application. The threshold size can be based on characteristics of the set of data, such as the size of the set of data (e.g., the volume of the set of data, the number of records in the set of data, the complexity of the set of data, etc.), the format of the set of data (e.g., the file format of the file 202 or the record format of records in the database 204), the complexity of the set of data (e.g., the vectors or subvectors associated with the set of data), and/or other characteristics of the set of data. The threshold size can also be based on requirements associated with processing the set of data, such as a client-specific agreement (e.g., an SLA) specifying an allowed time for processing the set of data. The threshold size can also be based on an operational characteristic associated with the computing system executing the data processing application, such as a time of day or day of the week, the capacity of the system, or another operational characteristic.

The size of the set of data to be processed is compared to the threshold size (406) and a mode of operation for the data processing application is selected based on the comparison. For instance, if the size of the set of data is larger than the threshold size, batch mode processing is selected (408). If the size of the set of data to be processed is equal to or smaller than the threshold size, continuous mode processing is selected (410).

The data processing application is executed according to the selected mode of operation to process the set of data (412). For instance, for batch mode processing, the batch mode implementation of the data processing application is compiled, loaded, and integrated into its processing framework prior to processing the set of data. For continuous mode processing, a precompiled data processing application (e.g., a precompiled micrograph) is loaded dynamically and used to process the set of data. The results of the processing are output from the data processing application (414) to a downstream location, such as a queue, a file, a database, and/or a display to a downstream user.

Figure 5:
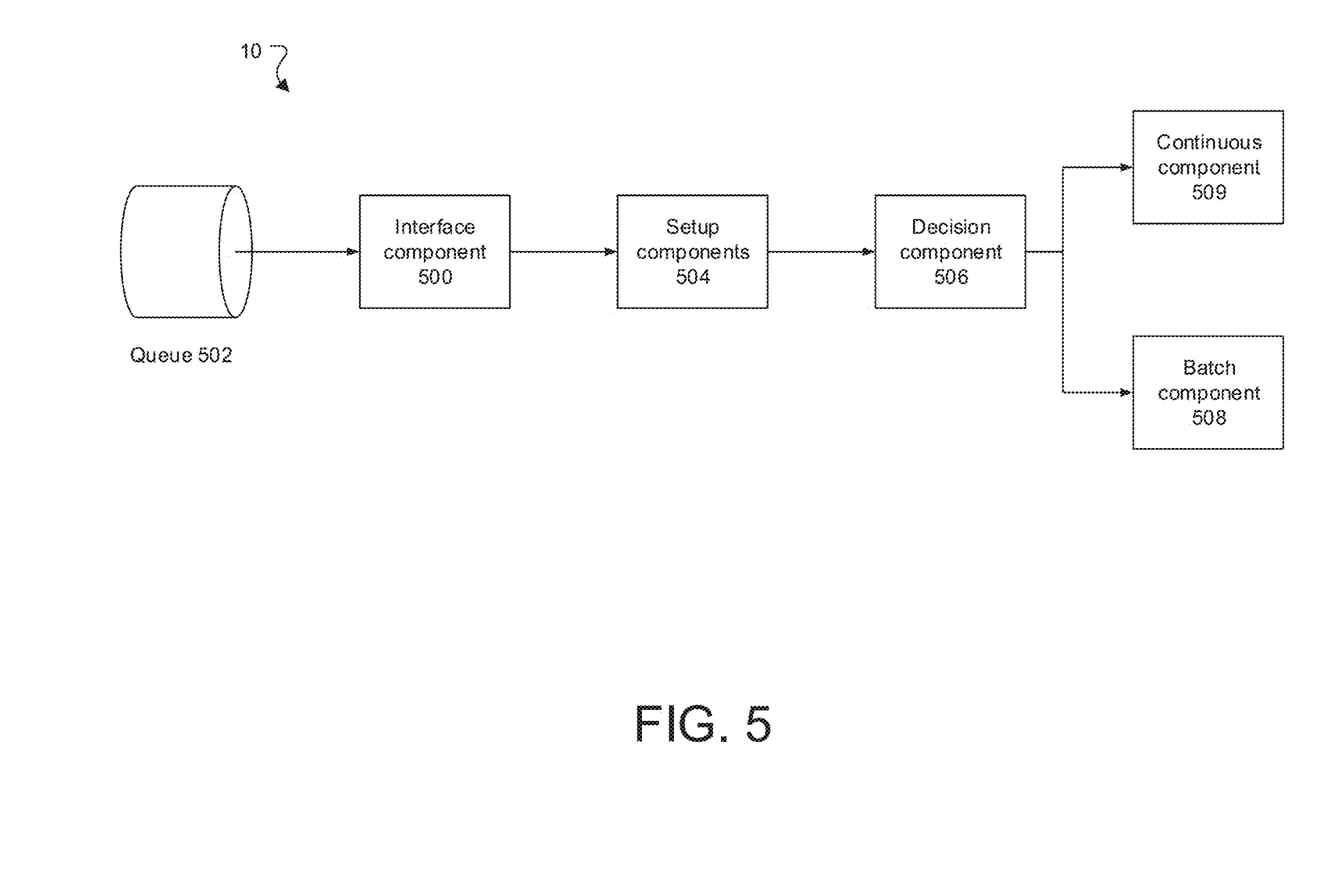
FIG. 5 is a block diagram of a processing framework.

Referring to FIG. 5, in a screenshot of an example graphical representation of a processing framework 10, a request to process a set of data is received and read at an interface component 500. The request can include information about the type of job that is to be executed for the set of data (e.g., an identifier of a data processing application to be used to process the set of data) and information about the source of the set of data (e.g., an identifier of a file or database). In some examples, the requests are queued in a queue 502 prior to being received by the interface component 500. In some examples, the interface component 500 carries out the functions described above for the interface block 206.

The request is processed by setup components 504 and arrives at the decision component 506. The decision component 506 evaluates the request to determine whether the set of data to be processed is to be considered large or small. Based on the evaluation, the decision component 506 sends a command to either a continuous component 509, e.g., a micrograph component or a batch component 508. In some examples, the decision component 506 carries out the functions described above for the decision block 212.

Figure 6A:
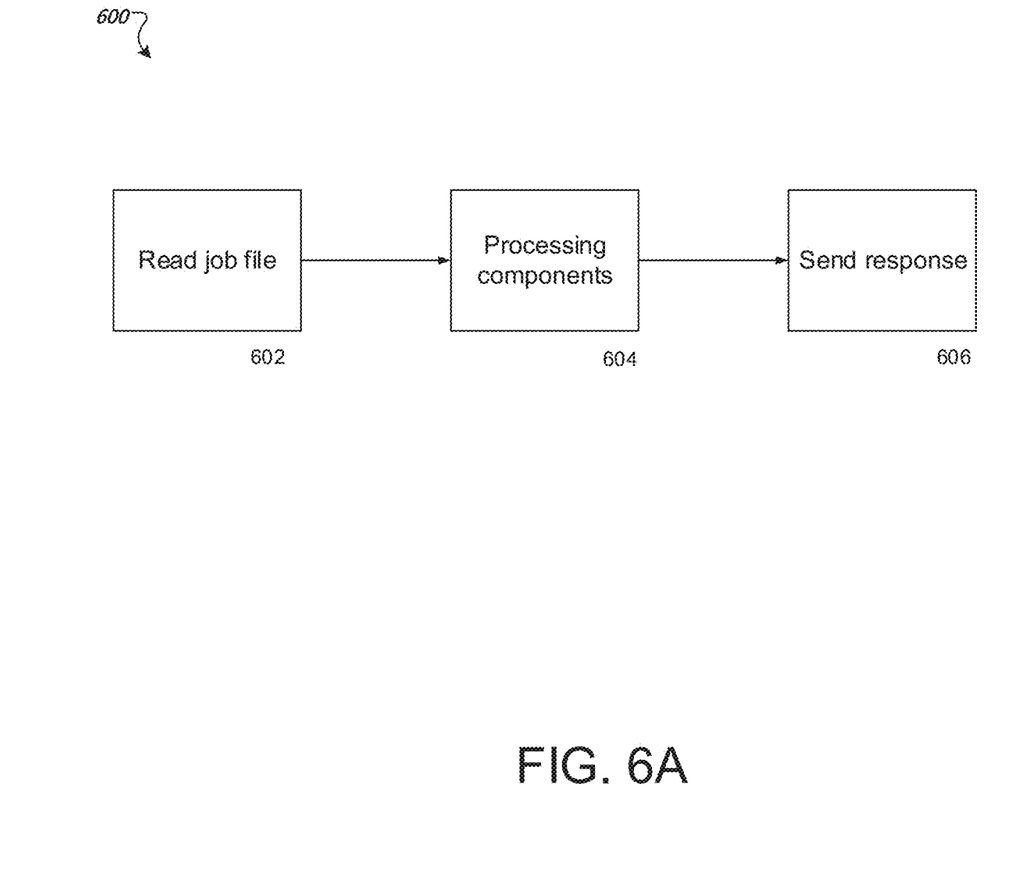
FIG. 6A is a block diagram of a data processing application.
Figure 6B:
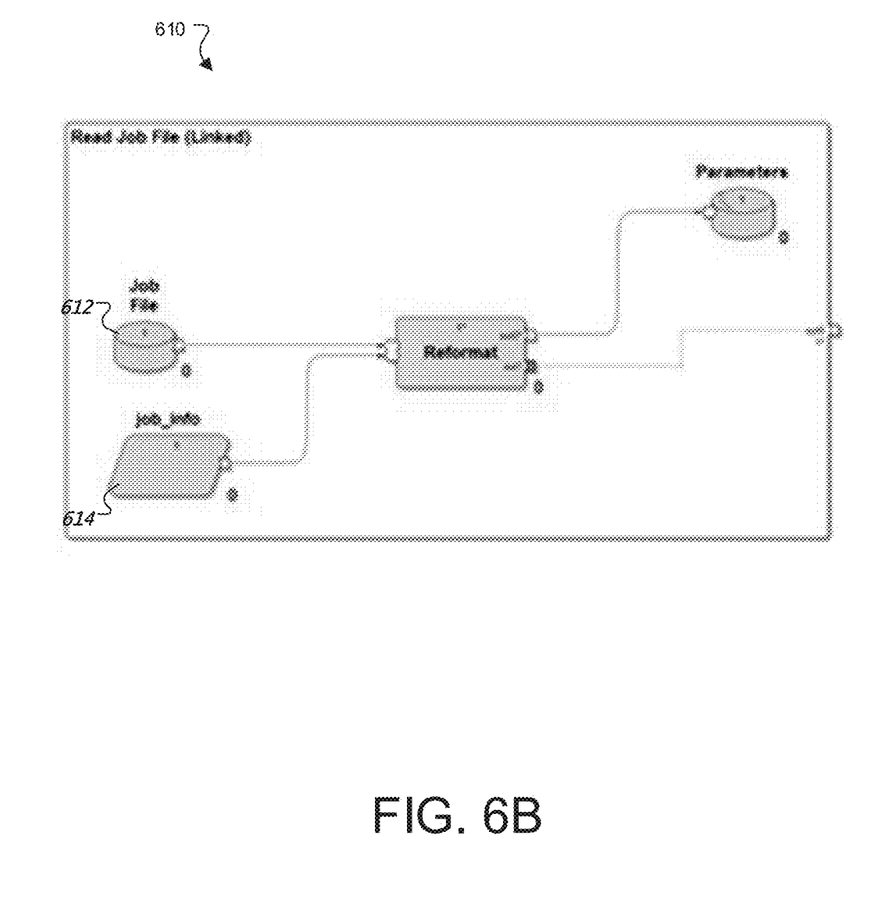
FIGS. 6B and 6C are screenshots of portions of the data processing application of FIG. 6A.
Figure 6C:
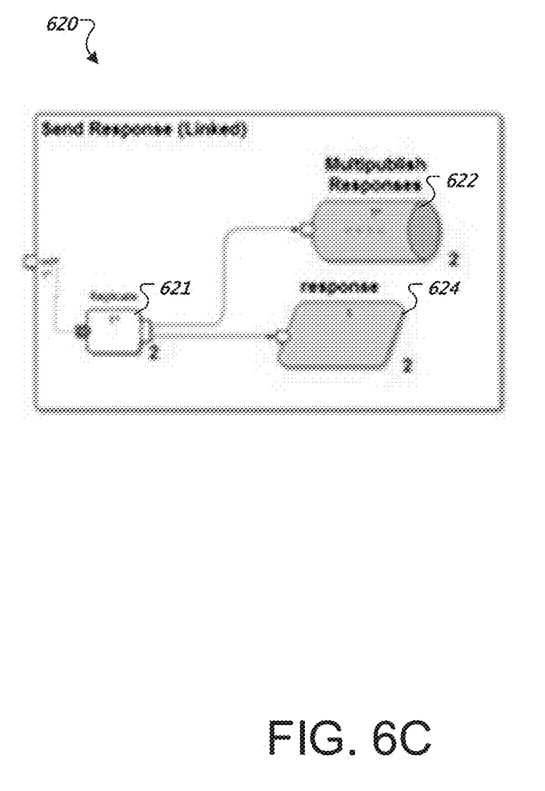

FIGS. 6A-6C show an example of a dataflow graph 600 that is configured to execute in either batch mode or continuous mode. A "read job file" component 602 integrates the dataflow graph 600 into the processing framework 10 (FIG. 5). For instance, the "read job file" component 602 can be implemented by a subgraph 610 that executes differently depending on whether the dataflow graph 600 is executed in batch mode or continuous mode. If the dataflow graph 600 is executed in batch mode, the graph starts by reading a job file 612 that passes run-time parameters to the batch mode dataflow graph 600. In continuous mode, job information, such as run-time parameters, arrives at the compiled, loaded, and initialized continuous mode dataflow graph 600 via a "job_info" component 614.

The dataflow graph 600 processes the data in batch mode or continuous mode at one or more processing components 604. For instance, in batch mode, the processing components 604 can include multiple processes that can be executed concurrently to provide rapid, efficient data processing. In continuous mode, the processing components 604 can include multiple processes to be executed serially. When processing is complete, a "send response" component 606 integrates the output of the dataflow graph 600 back into the processing framework 10, e.g., by formatting the output of the dataflow graph 600 as appropriate and sending the output to the processing framework 10. For instance, the "send response" component 606 can be implemented by a subgraph 620 that executes differently depending on whether the dataflow graph 600 is executed in batch mode or continuous mode. Output data is processed by a replicate component 621 that prepares the data for a queue 622 or a response component 624, depending on the mode of operation of the dataflow graph 600. If the dataflow graph is executed in batch mode, responses (e.g., output data) are returned to the processing framework 10 via the queue 622. In continuous mode, responses are returned via the response component 624.

The approach to dynamically determining a mode of operation of a data processing application can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

For instance, in addition to or as an alternative to the features described above, the following embodiments are described:

Embodiment 1 is directed to a method including receiving a request to process a set of data using a data processing application; based on a feature associated with the set of data, selecting between (i) a first mode in which one or more running processes of the data processing application are used to process the set of data and (2) a second mode in which one or more new processes of the data processing application are started up; and causing the data processing application to be executed according to the selected mode to process the set of data.

Embodiment 2 is directed to embodiment 1, wherein the one or more running processes are compiled and loaded into a memory prior to receiving the request to process the set of data.

Embodiment 3 is directed to any of the preceding embodiments, wherein the one or more running processes are in a standby mode prior to receiving the request to process the set of data.

Embodiment 4 is directed to any of the preceding embodiments, including, when the second mode is selected, compiling the data processing application and loading the compiled data processing application into a memory.

Embodiment 5 is directed to any of the preceding embodiments, wherein the one or more new processes include a process that is not compiled or loaded into memory prior to receiving the request to process the set of data.

Embodiment 6 is directed to any of the preceding embodiments, wherein the feature associated with the set of data includes one or more of a size of the set of data, a format of the set of data, or a complexity of the set of data.

Embodiment 7 is directed to any of the preceding embodiments, wherein selecting between the first mode and the second mode includes selecting the first mode when the size of the set of data is equal to or less than a threshold size; and selecting the second mode when the size of the set of data exceeds the threshold size.

Embodiment 8 is directed to embodiment 7, wherein the threshold size is based on a format of the set of data, and at least two different formats are each associated with a different threshold size.

Embodiment 9 is directed to embodiment 7 or 8, wherein the threshold size is based on a processing requirement associated with the set of data, and at least two different processing requirements are each associated with a different threshold size.

Embodiment 10 is directed to any of embodiments 7 to 9, wherein the threshold size is based on historical data indicative of the operation of the data processing application.

Embodiment 11 is directed to any of embodiments 7 to 10, including determining the threshold size during execution of the data processing application.

Embodiment 12 is directed to embodiment 11, wherein determining the threshold size during execution of the data processing application includes decreasing the threshold size if the data processing application executed according to the first mode executes more slowly than a reference rate; and increasing the threshold size if the data processing application executed according to the second mode executes more slowly than a reference rate.

Embodiment 13 is directed to any of the preceding embodiments, including determining a size of the set of data.

Embodiment 14 is directed to embodiment 13, wherein the set of data includes a file, and wherein determining the size of the set of data includes determining the size of the file.

Embodiment 15 is directed to embodiment 13 or 14, wherein the set of data includes data stored in a database, and wherein determining the size of the set of data includes querying the database.

Embodiment 16 is directed to any of the preceding embodiments, wherein the feature associated with the set of data includes a processing requirement associated with the set of data.

Embodiment 17 is directed to embodiment 16, wherein the processing requirement includes an allowed time for processing the set of data.

Embodiment 18 is directed to any of the preceding embodiments, wherein in the first mode, a component of the data processing application is compiled to machine code prior to receiving the request, and in the second mode, the component is compiled to machine code after receiving the request.

Embodiment 19 is directed to any of the preceding embodiments, wherein in the first mode, the one or more running processes are executed serially, and in the second mode, at least some of the one or more new processes are executed concurrently.

Embodiment 20 is directed to software stored on a computer-readable medium, the software including instructions for causing a computing system to receive a request to process a set of data using a data processing application; based on a feature associated with the set of data, select between (i) a first mode in which one or more running processes of the data processing application are used to process the set of data and (2) a second mode in which one or more new processes of the data processing application are started up; and cause the data processing application to be executed according to the selected mode to process the set of data.

Embodiment 21 is directed to a computing system including at least one processor configured to receive a request to process a set of data using a data processing application; based on a feature associated with the set of data, select between (i) a first mode in which one or more running processes of the data processing application are used to process the set of data and (2) a second mode in which one or more new processes of the a data processing application are started up; and cause the data processing application to be executed according to the selected mode to process the set of data.

Embodiment 22 is directed to a computing system including means for receiving a request to process a set of data using a data processing application; means for, based on a feature associated with the set of data, selecting between (i) a first mode in which one or more running processes of the data processing application are used to process the set of data and (2) a second mode in which one or more new processes of the data processing application are started up; and means for causing the data processing application to be executed according to the selected mode to process the set of data.

Embodiment 23 is directed to a method including receiving a request to process a set of data using a data processing application; identifying a particular mode of operation from multiple modes of operation of the data processing application based on a size of the set of data; and executing the data processing application according to the particular mode of operation to process the set of data.

Embodiment 24 is directed to embodiment 23, in which identifying the particular mode of operation includes selecting either a batch processing mode or a continuous processing mode. Embodiment 25 is directed to embodiment 23 or 24, in which identifying the particular mode of operation includes selecting the batch processing mode when the size of the set of data exceeds a threshold size; and selecting the continuous processing mode when the size of the set of data is less than the threshold size.

Embodiment 26 is directed to any of embodiments 23 to 25, and includes determining the size of the set of data.

Embodiment 27 is directed to embodiment 26, in which the set of data includes a file, and wherein determining the size of the set of data includes determining the size of the file.

Embodiment 28 is directed to embodiment 26 or 27, in which the set of data includes data stored in a database, and wherein determining the size of the set of data includes querying the database.

Embodiment 29 is directed to any of embodiments 23 to 28, and in which identifying a particular mode of operation includes determining whether the size of the set of data exceeds a threshold size.

Embodiment 30 is directed to embodiment 29, in which the threshold size is based on a format of the set of data or a processing requirement associated with the set of data.

Embodiment 31 is directed to embodiment 30, in which the processing requirement includes an allowed time for processing the set of data.

Embodiment 32 is directed to any of embodiments 29 to 31, and includes determining the threshold size.

Embodiment 33 is directed to any of embodiments 29 to 32, and includes determining the threshold size based on historical data indicative of the operation of the data processing application.

Embodiment 34 is directed to any of embodiments 29 to 33, and includes dynamically determining the threshold size.

Embodiment 35 is directed to any of embodiments 23 to 34, in which the data processing application includes at least one computation graph.

Embodiment 36 is directed to embodiment 35, in which the computation graph can be executed in a batch processing mode or a continuous processing mode.

What is claimed is:

1. A method including:
   receiving a request to process a set of data using a data processing application;
   responsive to the received request, and based on at least a size of the set of data, selecting either (i) a first mode in which one or more running processes of the data processing application are used to process the set of data based at least on the size of the set of data being equal to or less than a threshold size or (ii) a second mode in which one or more new processes of the data processing application are started up based at least on the size of the set of data exceeding the threshold size;
   causing the data processing application to be executed according to the selected mode to process the set of data, including:
     when the first mode is selected, processing the data using the one or more running processes, code corresponding to the one or more running processes having been compiled prior to receiving the request to process the set of data, and
     when the second mode is selected, compiling code corresponding to the one or more new processes and processing the data using the one or more new processes; and
   determining an adjusted threshold size during execution of the data processing application, including:
     decreasing the threshold size if the data processing application executed according to the first mode executes more slowly than a reference rate, and
     increasing the threshold size if the data processing application executed according to the second mode executes more slowly than a reference rate.

2. The method of claim 1, wherein the one or more running processes are loaded into a memory prior to receiving the request to process the set of data.

3. The method of claim 1, wherein the one or more running processes are in a standby mode prior to receiving the request to process the set of data.

4. The method of claim 1, including, when the second mode is selected, loading the new processes into a memory.

5. The method of claim 1, in which selecting either the first mode or the second mode includes selecting based further on one or more of a format of the set of data or a complexity of the set of data.

6. The method of claim 1, wherein the threshold size is based on a format of the set of data, and at least two different formats are each associated with a different threshold size.

7. The method of claim 1, wherein the threshold size is based on a processing requirement associated with the set of data, and at least two different processing requirements are each associated with a different threshold size.

8. The method of claim 1, wherein the threshold size is based on historical data indicative of the operation of the data processing application.

9. The method of claim 1, including determining the size of the set of data.

10. The method of claim 9, wherein the set of data includes a file, and wherein determining the size of the set of data includes determining the size of the file.

11. The method of claim 9, wherein the set of data includes data stored in a database, and wherein determining the size of the set of data includes querying the database.

12. The method of claim 1, in which selecting either the first mode or the second mode includes selecting based further on a processing requirement associated with the set of data.

13. The method of claim 12, wherein the processing requirement includes an allowed time for processing the set of data.

14. The method of claim 1, wherein in the first mode, the one or more running processes are executed serially, and in the second mode, at least some of the one or more new processes are executed concurrently.

15. The method of claim 1, in which the size of the set of data includes a volume of the set of data.

16. The method of claim 1, in which the size of the set of data includes a number of records in the set of data.

17. A non-transitory computer-readable medium storing instructions for causing a computing system to:
   receive a request to process a set of data using a data processing application;
   responsive to the received request, and based on at least a size of the set of data, select either (i) a first mode in which one or more running processes of the data processing application are used to process the set of data based at least on the size of the set of data being equal to or less than a threshold size or (ii) a second mode in which one or more new processes of the data processing application are started up based at least on the size of the set of data exceeding the threshold size;
   cause the data processing application to be executed according to the selected mode to process the set of data, including:
     when the first mode is selected, processing the data using the one or more running processes, code corresponding to the one or more running processes having been compiled prior to receiving the request to process the set of data, and
     when the second mode is selected, compiling code corresponding to the one or more new processes and processing the data using the one or more new processes; and
   determine an adjusted threshold size during execution of the data processing application, including:
     decreasing the threshold size if the data processing application executed according to the first mode executes more slowly than a reference rate, and
     increasing the threshold size if the data processing application executed according to the second mode executes more slowly than a reference rate.

18. The non-transitory computer readable medium of claim 17, wherein the one or more running processes are loaded into a memory prior to receiving the request to process the set of data.

19. The non-transitory computer readable medium of claim 17, wherein the one or more running processes are in a standby mode prior to receiving the request to process the set of data.

20. The non-transitory computer readable medium of claim 17, the instructions causing the computing system to, when the second mode is selected, load the new processes into a memory.

21. The non-transitory computer readable medium of claim 17, in which selecting either the first mode or the second mode includes selecting based further on one or more of a format of the set of data or a complexity of the set of data.

22. The non-transitory computer readable medium of claim 17, in which selecting either the first mode or the second mode includes selecting based further on a processing requirement associated with the set of data.

23. The non-transitory computer readable medium of claim 17, wherein in the first mode, the one or more running processes are executed serially, and in the second mode, at least some of the one or more new processes are executed concurrently.

24. A computing system including:
at least one processor configured to:
receive a request to process a set of data using a data processing application;
responsive to the received request, and based on at least a size of the set of data, selecting either (i) a first mode in which one or more running processes of the data processing application are used to process the set of data based at least on the size of the set of data being equal to or less than a threshold size or (ii) a second mode in which one or more new processes of the data processing application are started up based at least on the size of the set of data exceeding the threshold size;
cause the data processing application to be executed according to the selected mode to process the set of data, including:
when the first mode is selected, processing the data using the one or more running processes, code corresponding to the one or more running processes having been compiled prior to receiving the request to process the set of data, and
when the second mode is selected, compiling code corresponding to the one or more new processes and processing the data using the one or more new processes; and
determining an adjusted threshold size during execution of the data processing application, including:
decreasing the threshold size if the data processing application executed according to the first mode executes more slowly than a reference rate, and
increasing the threshold size if the data processing application executed according to the second mode executes more slowly than a reference rate.

25. The computing system of claim 24, wherein the one or more running processes are loaded into a memory prior to receiving the request to process the set of data.

26. The computing system of claim 24, wherein the one or more running processes are in a standby mode prior to receiving the request to process the set of data.

27. The computing system of claim 24, the at least one processor configured to, when the second mode is selected, load the new processes into a memory.

28. The computing system of claim 24, in which selecting either the first mode or the second mode includes selecting based further on one or more of a format of the set of data or a complexity of the set of data.

29. The computing system of claim 24, in which selecting either the first mode or the second mode includes selecting based further on a processing requirement associated with the set of data.

30. The computing system of claim 24, wherein in the first mode, the one or more running processes are executed serially, and in the second mode, at least some of the one or more new processes are executed concurrently.

31. A computing system including:
means for receiving a request to process a set of data using a data processing application;
means for, responsive to the received request, and based on at least a size of the set of data, selecting either (i) a first mode in which one or more running processes of the data processing application are used to process the set of data based at least on the size of the set of data being equal to or less than a threshold size or (ii) a second mode in which one or more new processes of the data processing application are started up based at least on the size of the set of data exceeding the threshold size;
means for causing the data processing application to be executed according to the selected mode to process the set of data, including:
when the first mode is selected, processing the data using the one or more running processes, code corresponding to the one or more running processes having been compiled prior to receiving the request to process the set of data, and
when the second mode is selected, compiling code corresponding to the one or more new processes and processing the data using the one or more new processes; and
means for determining an adjusted threshold size during execution of the data processing application, including:
decreasing the threshold size if the data processing application executed according to the first mode executes more slowly than a reference rate, and
increasing the threshold size if the data processing application executed according to the second mode executes more slowly than a reference rate.

* * * * *